(12) United States Patent
Hussain et al.

(10) Patent No.: US 10,484,736 B2
(45) Date of Patent: Nov. 19, 2019

(54) SYSTEMS AND METHODS FOR A MARKETPLACE OF INTERACTIVE LIVE STREAMING MULTIMEDIA OVERLAYS

(71) Applicant: GENERAL WORKINGS INC., San Francisco, CA (US)

(72) Inventors: Murtaza Hussain, San Francisco, CA (US); Morgan Lee Biemiller, San Francisco, CA (US); Eric Anthony Freytag, Oakland, CA (US); Ralph Alan Harris, Jr., Houston, TX (US)

(73) Assignee: General Workings Inc., San Francisco, CA (US)

( * ) Notice: Subject to any disclaimer, the term of this patent is extended or adjusted under 35 U.S.C. 154(b) by 0 days.

(21) Appl. No.: 15/918,767

(22) Filed: Mar. 12, 2018

(65) Prior Publication Data

US 2019/0281343 A1 Sep. 12, 2019

(51) Int. Cl.
*H04N 21/431* (2011.01)
*H04N 21/2187* (2011.01)
*H04N 21/485* (2011.01)
*H04N 21/8545* (2011.01)
*H04N 21/472* (2011.01)

(52) U.S. Cl.
CPC ..... *H04N 21/4312* (2013.01); *H04N 21/2187* (2013.01); *H04N 21/47202* (2013.01); *H04N 21/4858* (2013.01); *H04N 21/8545* (2013.01)

(58) Field of Classification Search
CPC .......... H04N 21/4312; H04N 21/2187; H04N 21/47202; H04N 21/4858; H04N 21/8545
USPC .......................................................... 725/38
See application file for complete search history.

(56) References Cited

U.S. PATENT DOCUMENTS

| 9,620,173 | B1 * | 4/2017 | Fay ..................... G11B 27/036 |
| 10,021,458 | B1 * | 7/2018 | Taylor .............. H04N 21/47815 |
| 2008/0115178 | A1 * | 5/2008 | Godin ................ H04N 7/17318 725/97 |
| 2011/0185378 | A1 * | 7/2011 | Johnson ............. H04N 5/44543 725/25 |
| 2013/0258118 | A1 | 10/2013 | Felt |
| 2016/0085863 | A1 | 3/2016 | Allen |
| 2018/0018079 | A1 | 1/2018 | Monastyrshyn |
| 2018/0139257 | A1 * | 5/2018 | Ninoles ............... H04L 65/4076 |
| 2018/0374128 | A1 | 12/2018 | Mao |

* cited by examiner

*Primary Examiner* — Cynthia M Fogg
(74) *Attorney, Agent, or Firm* — Sheppard Mullin Richter & Hampton LLP

(57) ABSTRACT

This present disclosure described methods for a marketplace of interactive live streaming multimedia overlays. At least one method includes a user playing video games on a computer, using software to stream all or part of their computer session to one or more streaming services, said software retrieving images from a web-service, some or all of said images having been acquired through an online marketplace, said images being used to create a video overlay, and said overlay being combined with the video of the user's computer session prior being encoded for transmission to one or more streaming services.

17 Claims, 12 Drawing Sheets

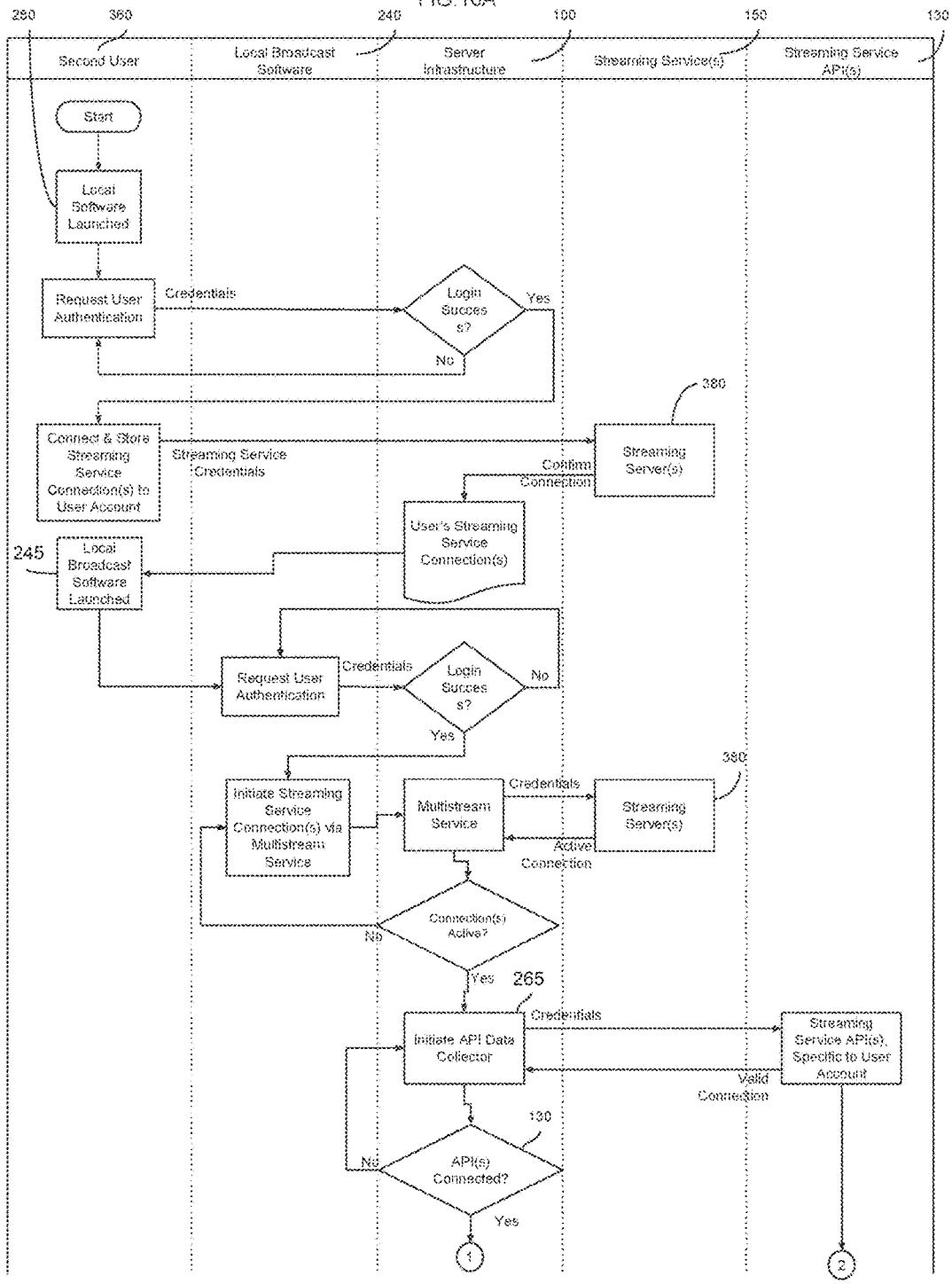

SYSTEMS AND METHODS FOR A MARKETPLACE OF INTERACTIVE LIVE STREAMING MULTIMEDIA OVERLAYS

FIELD OF THE DISCLOSURE

The present disclosure relates to marketplace of interactive live streaming multimedia overlays.

BACKGROUND

This present disclosure relates to methods for a marketplace of interactive live streaming multimedia overlays.

The online video industry has grown rapidly since YouTube made it simple to share online videos in 2005. Netflix introduced its streaming video service in 2007, followed by Hulu in 2008. All three services focused on pre-recorded video, also known as Video On Demand ("VOD"), until YouTube introduced YouTube Live in 2008. It marked the first easily accessible implementation of a live streaming video service.

Similarly, video games have evolved from single or multiplayer experiences shared around a single TV to complicated, internet-based multiplayer games that allow hundreds of thousands of players to participate in shared gaming experiences. Fans of video games historically used magazines such as GamePro Magazine to stay abreast of new game releases, uncover otherwise difficult to find game secrets, and to learn how optimize their gameplay. Eventually the medium was replaced by YouTube channels dedicated to video game content.

The popularity of online video game content lead to the founding of a new class of Streaming Services: Twitch, which was founded in 2011, and YouTube Gaming which came online in 2015. These services allowed players to directly broadcast their own gaming experiences to the world. Streaming Services differ from the aforementioned Netflix, Hulu, and YouTube products in that they focus on streaming live video, as opposed to pre-recorded VOD content. Today Twitch serves over 170 million visitors every month, and unlike YouTube's VOD product, which primarily serves short-form video, the average Twitch visitor views over an hour of streaming content. For the purpose of the present invention, the term Streaming Services refers to one or more services designed to stream live video content via a digital channel including, but not limited to, Twitch, YouTube Gaming, Mixer, and Facebook Live.

These extended viewing times are enabled by video game fans' voracious appetite for video game content, and by Streaming Services such as Twitch or YouTube Gaming providing tools to enable users broadcasting their games, the Streamers, to monetize the time they spend streaming their game sessions. These tools include allowing Viewers to sign up for a monthly subscription to the channel of a specific Streamers whose personality or gameplay they enjoy, a chat panel for viewers to chat with each other and the Streamer, and an extensive application programming interface (API) for developers to build applications that interface with the Streaming Services. Many Streamers are able to make a substantial living through Streaming Services and the ecosystems they have created.

Due to the instantaneous and live nature of video streamed to Streaming Services, it is not possible to edit a video before it goes live using traditional video editing software. To overcome this limitation broadcasting software, such as Open Broadcaster Software ("OBS"), has introduced the ability to use Overlays, which are graphical elements that are added to the Streamer's video immediately prior to the video being encoded and sent to Streaming Services for Viewer consumption. Overlays can consist of static or dynamic images, and they can be stored locally or hosted on a server.

Furthermore, Streaming Service APIs have created an ecosystem of third-party tools that help Streamers monetize their channels beyond Viewer subscriptions. Key features developed by third party services include facilitating donations (a primary source of income for Streamers), Multistreaming Services that broadcast a single Streamer's video feed to multiple simultaneous Streaming Services, chat bots that help Streamers engage with and manage their Viewers through the chat pane, and custom Overlays. Said custom Overlays can provide static images, such as decorative video borders, animated graphics that respond in real time to the actions of the Viewers or the game.

An example of a real-time alert includes an animated alert appearing in the Streamer's video feed when a Viewer subscribes, follows, or donates to the Streamer. This allows the Streamer to easily see Viewer monetization events as they occur. It also gives the Viewer a chance at notoriety as their name is displayed in front of potentially millions of other Viewers.

Another example of a real-time alert is a widget system that allows the Streamer to display the chat pane contents directly within the video feed. This allows the Streamer to monitor both the output of their live stream and their Viewer conversations in one place, without having to manually show and hide the chat panel while they are live. These and other alert examples have become integral to the success of Streaming Services, and Viewers have come to expect them from their favorite Streamers.

Graphics for custom Overlays heretofore were provided either by the end user as local files or as preset templates hosted on a server by the third-party service. The templates can be customized into an almost infinite array of configurations. Additionally, Streamers often prefer to have different Overlay configurations for different games, as different games produce different graphical looks and feels that coordinate best with different Overlay settings. For these reasons, Overlay configurations often require considerable time, effort, and potentially some technical know-how to produce, all of which take away from time the Streamer could instead dedicate to monetizing their channel.

Alternatively, a Streamer can hire a graphic designer to produce custom Overlays for their channel. This usually requires a specialty in video game design or animation, very specific understanding of the market, potentially access to the Streamer's account on the third-party service, and knowledge of how to operate the third-party systems. This also requires an interested Streamer and designer to connect via job ads, referrals, or coincidence; while each of the aforementioned methods are valid, they do not provide a distribution channel through which designers can publish Overlay graphics for potential monetization, nor do they streamline the browsing, acquisition, and consumption of Overlay graphics by Streamers.

SUMMARY

Presently disclosed is a method for a marketplace of interactive live streaming multimedia overlays. In embodiments, the method includes a server infrastructure configured to permit a plurality of users to upload and store graphics and/or audio and overlay configuration information for a given video overlay, where said configuration information specifies values for one or more settings that define the application of the image and/or audio of the given video overlay, said infrastructure being configured to transmit to client computing platforms associated with users information that facilitates presentation of views of a marketplace, said graphics being selectable by one or more users, where a copy of the selected graphics are made available to a second user; providing a video overlay hosted on the server infrastructure, said overlay being configured to incorporate graphics; said second user adding one or more of said graphics to the overlay configuration; the second user saving the overlay configuration; server infrastructure configured to receive the second user's acceptance of said graphics and the second user's overlay configuration; server infrastructure producing an image file based on the overlay configuration then providing the client computing platforms associated with the second user access to the corresponding video overlays; broadcasting software operated by the second user retrieving the overlay image from the server; the broadcasting software encoding video output from the second user's computer and the overlay image to produce a video file; uploading the encoded video file to a streaming service; the streaming service decoding the video file; the streaming service displaying the video file for consumption by a plurality of users.

In some embodiments, the server infrastructure is configured to facilitate the designing, editing, and animating of the graphics.

In some embodiments, the broadcasting software encodes the output of the user's local webcam with the overlay and the video feed.

In some embodiments, the broadcasting software is operated from a self-contained mobile computer, such as a smartphone, augmented reality equipment, or virtual reality equipment.

In some embodiments, the broadcasting software combines media outputs from multiple computers to produce the encoded video file.

In some embodiments, the second user can edit the copy of the graphics they have selected before the graphics are added to the overlay.

In some embodiments, the graphics are offered for sale.

In some embodiments, multiple graphics are organized into templates.

In some embodiments, the graphics or templates are grouped for browsing by specific content types.

In some embodiments, the graphics are static images.

In some embodiments, the video overlay is applied to other video content as a filter.

In some embodiments, the graphics are dynamic images, which are added to the overlay image file in a predetermined sequence over consecutive frames to generate an animation.

In some embodiments, the selected graphics are initiated at random time intervals, where an algorithm randomly selects intervals in which to display the selected graphics.

In some embodiments, the selected graphics are initiated at predetermined intervals, where a timer is configured by either the first or the second user to display the selected graphics at said configured intervals.

In some embodiments, the overlay configuration specifies the position, duration, and/or real-time event trigger for determining when the image and/or audio of the given video overlay is applied.

Also disclosed is a method for a marketplace of interactive live streaming multimedia overlays that includes a server infrastructure configured to permit a plurality of users to upload and store graphics and/or audio and overlay configuration information for a given video overlay, where said configuration information specifies values for one or more settings that define the application of the image and/or audio of the given video overlay, said infrastructure being configured to transmit to client computing platforms associated with users information that facilitates presentation of views of a marketplace, said graphics being selectable by one or more users; providing a video overlay hosted on the server infrastructure, said overlay being configured to incorporate graphics; the server infrastructure configured to receive data from a data API; the graphics configured by a first user to respond to one or more predefined API data events; a second user adding one or more of said graphics to the overlay configuration; the second user saving the overlay configuration; server infrastructure configured to receive the second user's acceptance of said graphics and the second user's overlay configuration; the server infrastructure producing an overlay image file including said graphics in response to the predefined API data events then providing the client computing platforms associated with the second user access to the corresponding video overlays; broadcasting software operated by the second user retrieving the overlay image from the server; the broadcasting software encoding video output from the second user's computer and the overlay image to produce a video file; uploading the encoded video file to a streaming service; the streaming service decoding the video file; the streaming service displaying the video file for consumption by a plurality of users.

In some embodiments, the API data is received from multiple data API sources.

In some embodiments, some or all API data is received from a program operating on the second user's local computer, such as the user's video game program.

In some embodiments, some or all API data is received from a computer vision program or artificial intelligence engine operating on the second user's computer.

In some embodiments, some or all API data is received from a computer vision program or artificial intelligence engine operating in the server infrastructure.

In some embodiments, some or all API data is received from a computer vision program or artificial intelligence engine operating in the multistream service.

Also disclosed is a method for a marketplace of interactive live streaming multimedia overlays that includes a server infrastructure configured to permit a plurality of users to upload and store graphics and/or audio and overlay configuration information for a given video overlay, where said configuration information specifies values for one or more settings that define the application of the image and/or audio of the given video overlay, said infrastructure being configured to transmit to client computing platforms associated with users information that facilitates presentation of views of a marketplace, said graphics being selectable by one or more users; providing a video overlay hosted on the server infrastructure, said overlay being configured to incorporate graphics; the server infrastructure configured to receive data from a data API; the graphics configured by the first user to respond to one or more predefined API data events; a second user adding one or more of said graphics to the overlay configuration; the second user saving the overlay configuration; server infrastructure configured to receive the second user's acceptance of said graphics and the second user's overlay configuration; the server infrastructure producing an overlay image file including said graphics in response to the predefined API data events then providing the client computing platforms associated with the second user access to the corresponding video overlays; broadcasting software operated by the second user retrieving the overlay image from the server infrastructure; the broadcasting software encoding video output from the second user's computer and the overlay image to produce an encoded video file prior to transmission to a third server for broadcasting; uploading the encoded output of the overlay and video to a multistream service, which is configured to upload the encoded video file to one or more streaming services; the streaming services then decode the video file and display the video file for consumption by a plurality of users.

In some embodiments, the multistream service decodes the encoded video file, then encodes the video in formats suitable to one or more streaming services, then uploads the encoded outputs to each corresponding streaming service; the streaming services then decode the video file and display the video for consumption by a plurality of users.

In some embodiments, API data is received from multiple data API sources; one or more data sources are designated to create graphics specific to one or more video streaming services; said graphics are used to create one or more overlay; the encoded output of the video and each overlay are then uploaded to a multistream service, which uploads one or more corresponding encoded outputs to one or more corresponding streaming service.

BRIEF DESCRIPTION OF THE DRAWINGS

A better understanding of the various disclosed embodiments can be obtained when the following detailed description is considered in conjunction with the attached drawings, in which:

FIGS. 10A and 10B show a software flowchart and functional distribution for a third illustrative embodiment.

Figure 1:
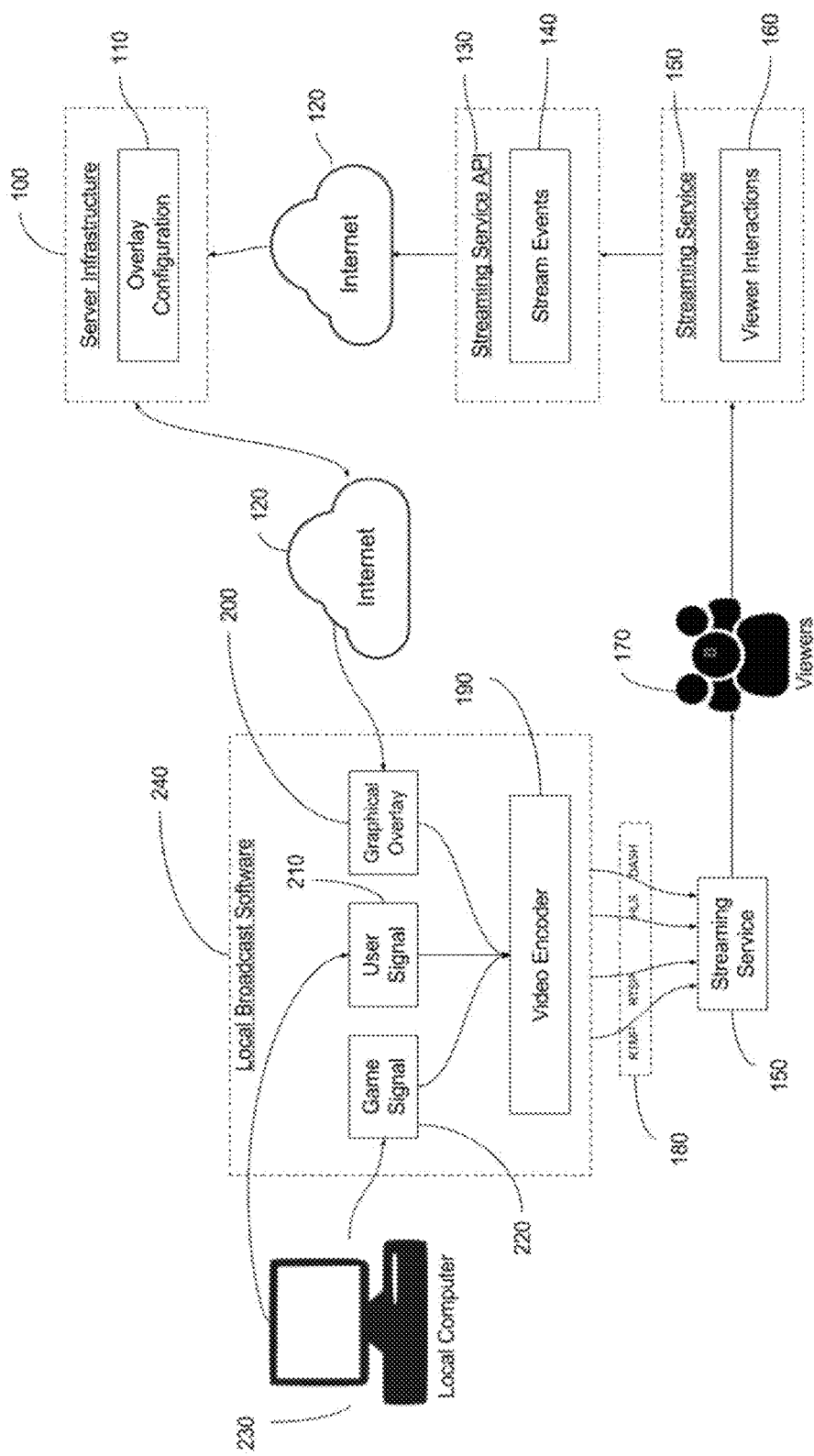
FIG. 1 shows a system diagram that includes an illustrative Web Infrastructure.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Introduction

The disclosed embodiments relate to a marketplace for streaming multimedia overlays for use with video games, movies, entertainment media and/or other non-entertainment media. More specifically, the disclosed embodiments relate to interconnected systems executing software related to acquiring new graphics and animations for use in a dynamically-generated, web-hosted streaming video overlay.

The disclosed embodiments rely on a live video streaming architecture, where part of the stream includes inserting a graphical overlay prior to encoding the video for distribution. The first user in these embodiments provides custom graphics to the marketplace. The second user (e.g. the "streamer") selects and configures from among the graphics in the marketplace those that will be generated into a video overlay in real time based on timers, specific events, or data received from third party data sources. The second user then configures local broadcast software to combine two or more separate data sources into an encoded video: a specific application or video game signal; the internet-hosted video overlay, which is generated by the server infrastructure at regular intervals to potentially give the appearance that it is animated and synchronized to current events in the application or video game signal; and optionally the second user's local camera feed, which, when included, may allow viewers to see the second user as they are using their application or playing a video game. The aforementioned signals are then encoded by the user's local broadcast software for upload to one or more streaming websites, such as Twitch, YouTube Gaming, Mixer, or Facebook Live.

Given that video overlays are integral to the monetization of a streamer's channel, and given that streamers usually receive donations and subscriptions while they are streaming, it is in their best interest to minimize the time they spend managing and customizing their video overlay.

In contrast to prior systems, a user-generated marketplace for graphics and animations used in dynamic multimedia overlays makes it seamless for streamers to discover and try new video overlay designs to find what works best for their viewers. Because the designs are uploaded by a plurality of users, the range and variety of potential designs will scale with greater ease when compared to prior systems, where designs are provided by a single company. Furthermore, the disclosed embodiments enable a new channel through which designers can seamlessly create, edit, market, monetize, and distribute custom graphics and animations used in streaming video overlays directly to the users of said overlays. Designers are incentivized to participate in the marketplace through the potential to have their work seen by tens of thousands of viewers and the potential to monetize their work. This flexibility and scalability was not possible with prior systems, such as those discussed above, in which these transactions occurred in private and relied on individuals connecting through research or happenstance.

The paragraphs that follow describe in detail various examples of the above-described embodiments. An example of an illustrative Web infrastructure is described, followed by an illustrative Web infrastructure utilizing dynamic data and multi-streaming infrastructure. The individual use-cases that complete the system (i.e., populating the marketplace, optionally organizing images into a template, purchasing a graphic or template, and using images to configure an overlay) are then described through software flowcharts. A non-limiting illustrative example of a configured overlay is then provided. Finally three illustrative embodiments are described, wherein the video overlay might be static or dynamic, the data sources may be one or many, and the broadcasting architecture may be direct or include multicast infrastructure.

Web Infrastructure

FIG. 1 shows an overview of an illustrative embodiment of a marketplace of interactive live streaming multimedia overlays that includes a Server Infrastructure 100, an Internet 120 infrastructure, a Local Computer 230 operating a Local Broadcast Software 240, a Streaming Service 150, Viewers 170, a method for collecting Viewer Interactions 160, and a Streaming Service API 130. The Server Infrastructure 100 contains a method for persistent storage, such as a database, as well as a method for initiating and responding to internet requests, such as a web server. The Server Infrastructure 100 stores and makes various user settings available for retrieval, including the user's Overlay Configuration 110.

The Local Computer 230 may be a traditional desktop computer, a laptop, a mobile phone, a virtual or augmented reality computing device, or any related personal computing device. The Streaming Service API 130 connection may be unidirectional or bilateral. The Streaming Service API 130 may also be a RESTful service, a persistent websockets connection, or any other method of regularly publishing and sharing information between disparate internet systems. The Game Signal 220 includes, but is not limited to, an audio/video signal from a videogame, a specific application unrelated to a videogame, or the user's operating system environment including some or all applications the user has executed. Multiple Game Signals 220 and User Signals 210 may also be combined to create the Game Signal 220 or User Signal 210.

In the embodiment shown, the Server Infrastructure 100 responds to requests from the Local Broadcast Software 240 executing on the Local Computer 230, and further retrieves the Overlay Configuration 110 as needed. The Local Software may be stored on a non-volatile information medium, or it may be downloaded onto the Local Computer 230 via, e.g., the Internet 120.

The core functionalities of the Server Infrastructure 100 include, but are not limited to:

1. Responding to requests from the Local Broadcast Software 240, Local Computer 230, or Streaming Service API 130;
2. Hosting the marketplace from which the user selects the graphics that comprise the user's Overlay Configuration 110;
3. Hosting a web page that allows users to edit their Overlay Configuration 110;
4. Initiating and maintaining persistent connections with the Streaming Service API 140;
5. Generating the Graphical Overlay 200 based on the user's Overlay Configuration 110 at set intervals, based on specific data events, upon request, or otherwise as needed;
6. Maintaining User account information; and
7. Hosting and web sites required to support the disclosed system.

The core functionalities of the Local Broadcast Software 240 include, but are not limited to:

1. Receiving a Game Signal 220 and, optionally, a User Signal 210 from the Local Computer 230;
2. Using the Internet 120 to retrieve the Graphical Overlay 200 from the Server Infrastructure 100;
3. Using the Video Encoder 190 to produce a video file from the Game Signal 220, the optional User Signal 210, and the Graphical Overlay 200;
4. Sending authentication information to the Streaming Service 150 to identify the user uploading the video file;
5. Uploading the video file to a Multistream Service 250 using Streaming Protocols 180;
6. Storing user settings related to, but not limited to:
   a. Streaming Services 150 the user may broadcast their encoded video file;
   b. Encoding settings used to configure and optimize the Video Encoder 190; and
   c. Streaming settings used to configure and optimize the Streaming Protocols 180 used to upload the video file to Streaming Service 150.

The core functionalities of the Streaming Service 150 include, but are not limited to:

1. Storing account details for the user;
2. Receiving authentication information from the Local Broadcast Software 240;
3. Using the authentication information to identify the user uploading the video file;
4. Receiving the uploaded video file from the Local Broadcast Software 240 via a Streaming Protocol 180;
5. Decoding the video file;
6. Playing the decoded video file for Viewers 170 to consume on the user's channel;
7. Gathering metadata about Viewer Interactions 160 including, but not limited to:
   a. The type of interaction;
   b. The time of the interaction;
   c. The Viewer's 170 account details; and
8. Storing Viewer Interactions 160 for retrieval by the Streaming Service API 130.

The core functionalities of the Streaming Service API 130 include, but are not limited to:

1. Retrieving Viewer Interactions 160 for processing;
2. Processing Viewer Interactions 160 into Stream Events 140 formatted for use in the Streaming Service API 130;
3. Sending the Stream Events 140 to the connected Server Infrastructure 100 via the Streaming Service API 130.

Web Infrastructure with Multiple Data Sources and Multistreaming Infrastructure

Figure 2:
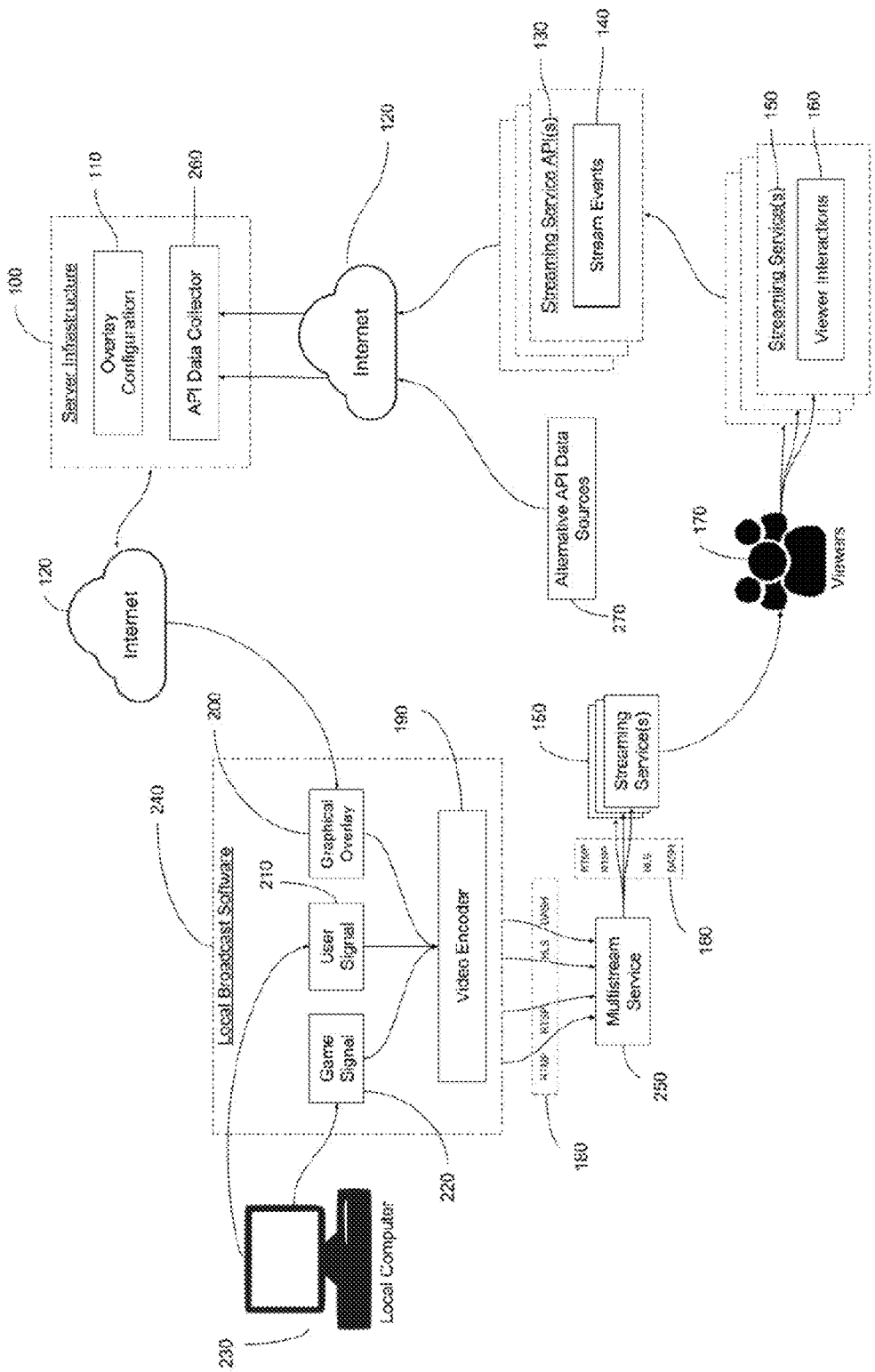
FIG. 2 shows a system diagram that includes an illustrative Web Infrastructure with multiple data sources and multistream infrastructure.

FIG. 2 shows an overview of an illustrative embodiment of a marketplace of interactive live streaming multimedia overlays that includes the Server Infrastructure 100, an Internet 120 infrastructure, a Local Computer 230 operating Local Broadcast Software 240, a Multistream Service 250, a Streaming Service 150, Viewers 170, a method for collecting Viewer Interactions 160, and one or more Streaming Service API(s) 130. The Server Infrastructure 100 contains a method for persistent storage, such as a database, as well as a method for initiating and responding to internet requests, such as a web server. The Server Infrastructure 100 stores and makes various user settings available for retrieval, including the user's Overlay Configuration 110. This embodiment potentially includes Alternative API Data Sources 270, which are data sources unrelated to the Streaming Service API(s) 130 that are used in the creation of the Graphical Overlay 200. This embodiment of the Server Infrastructure 100 contains an API Data Collector 260, which is responsible for aggregating data from one or more Streaming Service API(s) 130 and Alternative API Data Sources 270. Data gathered by the API Data Collector 260 is then used in combination with the user's Overlay Configuration 110 to populate the Graphical Overlay 200. While not depicted in this embodiment, the Alternative API Data Sources 270 may also be generated by a local program executing on the user's computer.

The Local Computer 230 may be a traditional desktop computer, a laptop, a mobile phone, a virtual or augmented reality computing device, or any related personal computing device. The Streaming Service API(s) 130 and the Alternative API Data Sources 270 connection(s) may be unidirectional or bilateral. The Streaming Service API(s) 130 and the Alternative API Data Sources 270 may also be a RESTful service, a persistent websockets connection, or any other method of regularly publishing and sharing information between disparate internet systems. The Game Signal 220 includes, but is not limited to, an audio/video signal from a videogame, a specific application unrelated to a videogame, or the user's operating system environment including some or all applications the user has executed. Multiple Game Signals 220 and User Signals 210 may also be combined to create the Game Signal 220 or User Signal 210.

In the embodiment shown, the Server Infrastructure 100 responds to requests from the Local Broadcast Software 240 executing on the Local Computer 230, and further retrieves the Overlay Configuration 110 as needed. The Local Software may be stored on a non-volatile information medium, or it may be downloaded onto the Local Computer 230 via, e.g., the Internet 120.

The core functionalities of the Server Infrastructure 100 include, but are not limited to:

1. Responding to requests from the Local Broadcast Software 240, Local Computer 230, or Streaming Service API 130;
2. Hosting the marketplace from which the user selects the graphics that comprise the user's Overlay Configuration 110;
3. Hosting a web page that allows users to edit their Overlay Configuration 110;
4. Executing the API Data Collector 260, which may perform, but is not limited to, the following actions:
   a. Maintains persistent connections with the Streaming Service API(s) 130;
   b. Receives data from Alternative API Data Sources 270;
   c. Stores metadata about the data received from the Streaming Service API(s) 130 and Alternative API Data Sources 270;
   d. Stores data aggregated from one or more source related to the user in the user's account;
5. Generating the Graphical Overlay 200 based on the user's Overlay Configuration 110 at set intervals, based on specific data events as they are received in real time by the API Data Collector 260, upon request, or otherwise as needed;
6. Maintaining user account information;
7. Hosting the Multistream Service 250; and
8. Hosting and web sites required to support the disclosed system.

The core functionalities of the Local Broadcast Software 240 include, but are not limited to:

1. Receiving a Game Signal 220 and, optionally, a User Signal 210 from the Local Computer 230;
2. Using the Internet 120 to retrieve the Graphical Overlay 200 from the Server Infrastructure 100;
3. Using the Video Encoder 190 to produce a video file from the Game Signal 220, the optional User Signal 210, and the Graphical Overlay 200;
4. Sending authentication information to the Streaming Service 150 to identify the user uploading the video file;
5. Uploading the video file to a Multistream Service 250 using Streaming Protocols 180;
6. Storing user settings related to, but not limited to:
   a. Streaming Services 150 the user may broadcast their encoded video file;
   b. Encoding settings used to configure and optimize the Video Encoder 190; and
   c. Streaming settings used to configure and optimize the Streaming Protocols 180 used to upload the video file to Streaming Service 150.

The core functionalities of the Multistream Service 250 include, but are not limited to:

1. Storing user configuration settings to control which Streaming Service(s) 150 an uploaded video file should be redistributed to;
2. Optionally receiving authentication information from the Local Broadcast Software 240;
3. If authentication information is received, forwarding said authentication information to one or more Streaming Services 150;
4. Receiving the uploaded video file from the Local Broadcast Service 240 via a Streaming Protocol 180;
5. Optionally decoding the video file, then re-encoding the file to optimize it for individual Streaming Service(s) 150; or
6. Uploading the video file to one or more Streaming Service 150 using a Streaming Protocol 180.

The core functionalities of each of the Streaming Service (s) 150 include, but are not limited to:

1. Storing account details for the user; 2. Receiving authentication information from the Local Broadcast Software 240 and/or the Multistream Service 250;
3. Using the authentication information to identify the user uploading the video file;
4. Receiving the uploaded video file from the Multistream Service 250 via a Streaming Protocol 180;
5. Decoding the video file;
6. Playing the decoded video file for Viewers 170 to consume on the user's channel;
7. Gathering metadata about Viewer Interactions 160 including, but not limited to:
   a. The type of interaction;
   b. The time of the interaction;
   c. The Viewer's 170 account details; and
8. Storing Viewer Interactions 160 for retrieval by the Streaming Service API(s) 130.

The core functionalities of the Streaming Service API(s) 130 include, but are not limited to:

1. Retrieving Viewer Interactions 160 for processing;
2. Processing Viewer Interactions 160 into Stream Events 140 formatted for use in the Streaming Service API(s) 130;
3. Sending the Stream Events 140 to the API Data Collector 260 via the Streaming Service API(s) 130.

The primary implementations of the Alternative API Data Sources 270 include, but are not limited to:

1. Data received directly from the videogame;
2. Data received from a computer vision and/or an artificial intelligence engine analysis of the game;
3. Data received from third party APIs related to the user's game, the user, or the Viewers 170.

Populating the Marketplace

Figure 3:
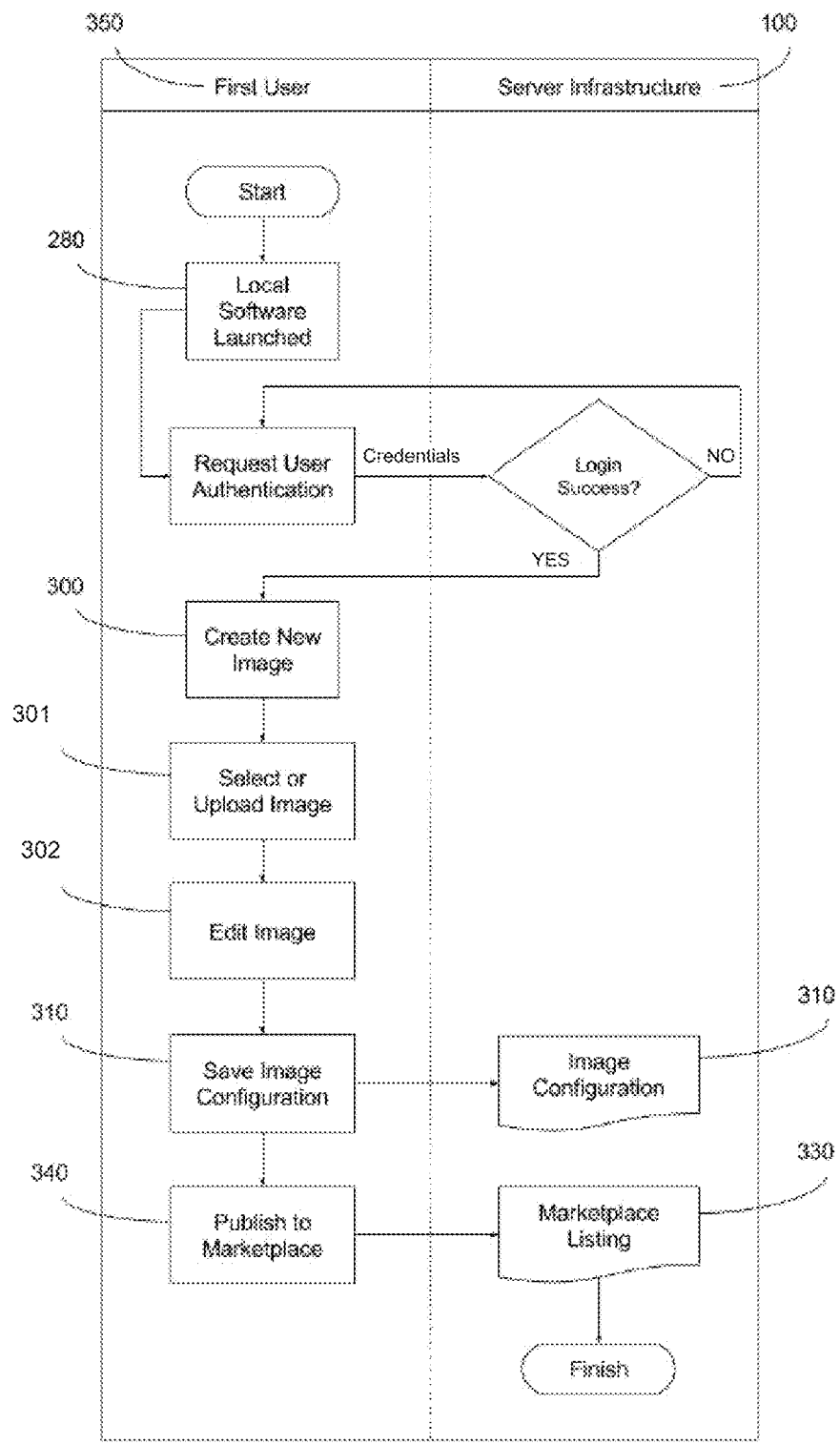
FIG. 3 shows a software flowchart and functional method for populating an overlay marketplace.

FIG. 3 shows an illustrative process view of a user populating the overlay marketplace with new graphics.

A First User 350 launches the Local Software in step 280. The Local Software may be executed by any type of a Local Computer 230, and it may be presented as a web page or a local application. The First User 350 then uses the Local Software to authenticate with the Server Infrastructure 100. Credentials are then passed from the Local Software to the Server Infrastructure 100, which validates the authentication attempt.

Once authenticated, the First User 350 chooses to create a new Image in step 300 using the Local Software of step 280. The First User 350 can begin creating a new Image in step 300 either by selecting an existing Image to modify or uploading a new Image from their Local Computer 230 in step 301. After creating the starting Image in step 300, the First User 350 can optionally choose to edit the Image before finalizing the Image Configuration in step 302, which saves a copy of the Image Configuration to the Server Infrastructure 100. Editing the Image in step 302 can include changing the underlying graphics or changing the specific data event(s) with which the Image is associated.

After the Image Configuration has been saved in step 310, the First User 350 chooses to publish their Image to the Marketplace in step 340. This prompts the Server Infrastructure 100 to generate and save a copy of the Marketplace Listing in step 330, which is then published and accessible to users searching for new graphics.

Combining Multiple Graphics to Form a Template

Figure 4:
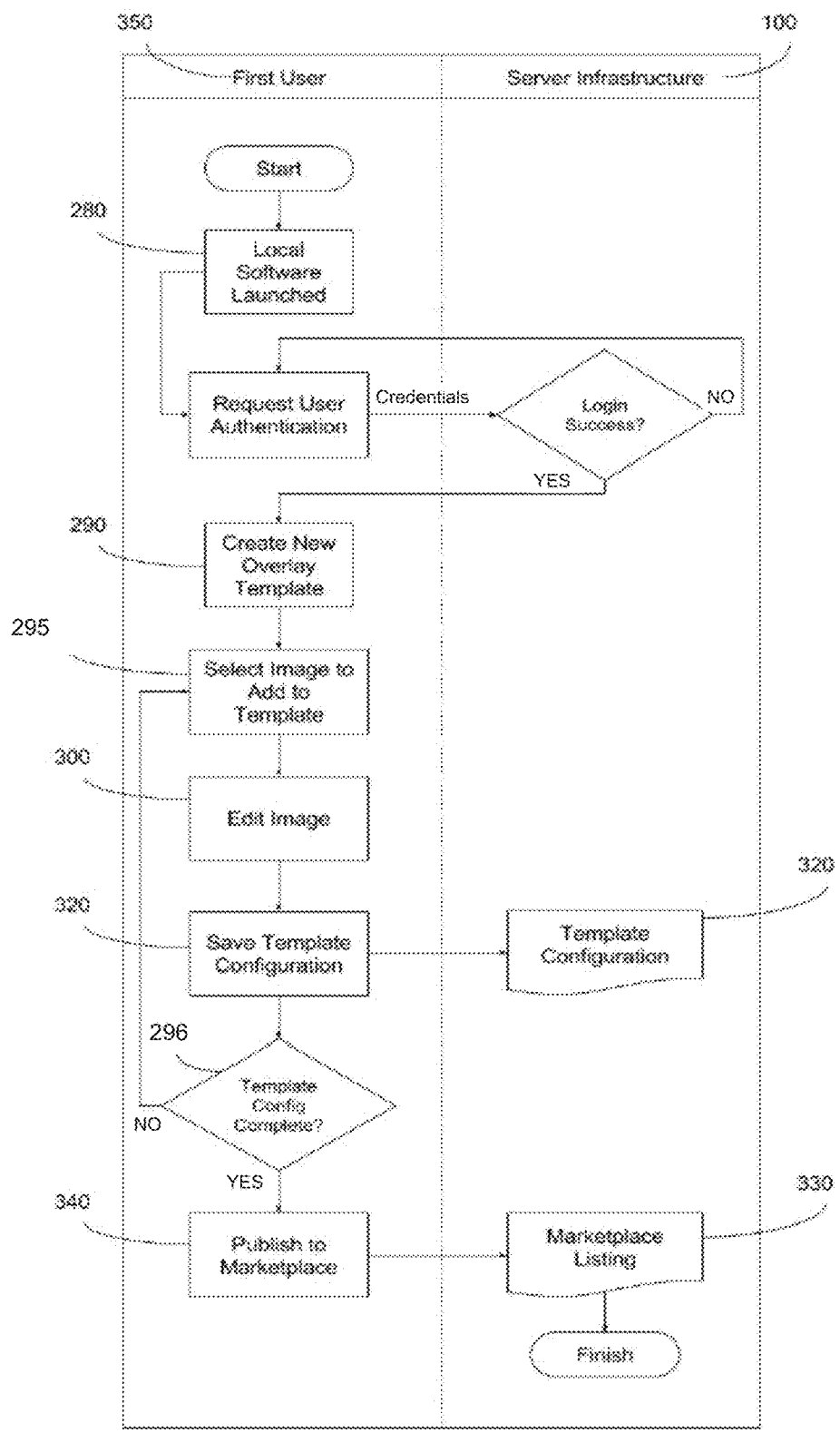
FIG. 4 shows a software flowchart and functional method for organizing overlay images into a template.

FIG. 4 shows an illustrative process view of a user combining multiple graphics into a graphical template.

A First User 350 launches the Local Software in step 280. The Local Software may be executed by any type of a Local Computer 230, and it may be presented as a web page or a local application. The First User 350 then uses the Local Software in step 280 to authenticate with the Server Infrastructure 100. Credentials are then passed from the Local Software to the Server Infrastructure 100, which validates the authentication attempt.

Once authenticated, the First User 350 chooses to create a new Template in step 290. The Template of step 290 is a collection of new and/or existing Images that are organized into a single graphic. This allows a Second User 360 to purchase all of the contained Images at once instead of having to acquire each of the contained Images separately. This also permits a First User 350 to organize a collection of Images that form a whole, cohesive design.

The First User 350 starts by selecting an Image to add to the Template in step 295. They then have the option to edit the Image in step 300 prior to saving it within the Template Configuration in step 320, which saves a copy of the Template Configuration of step 320 to the Server Infrastructure 100. Editing the Template Configuration as in step 300 can include changing the underlying Images or changing the specific data event(s) with which one or more Image within the Template is associated.

After the Template Configuration has been saved in step 320, the First User 350 determines whether more Images need to be added to the Template. If so, they repeat the process of adding new Images to the Template as in step 295, 300, and 320. Once complete, the First User 350 chooses to publish their Template to the Marketplace in step 340. This prompts the Server Infrastructure 100 to generate and save a copy of the Marketplace Listing in step 330, which is then published and accessible to users searching for new graphics.

Purchasing an Image or Template for Use in Overlay

Figure 5:
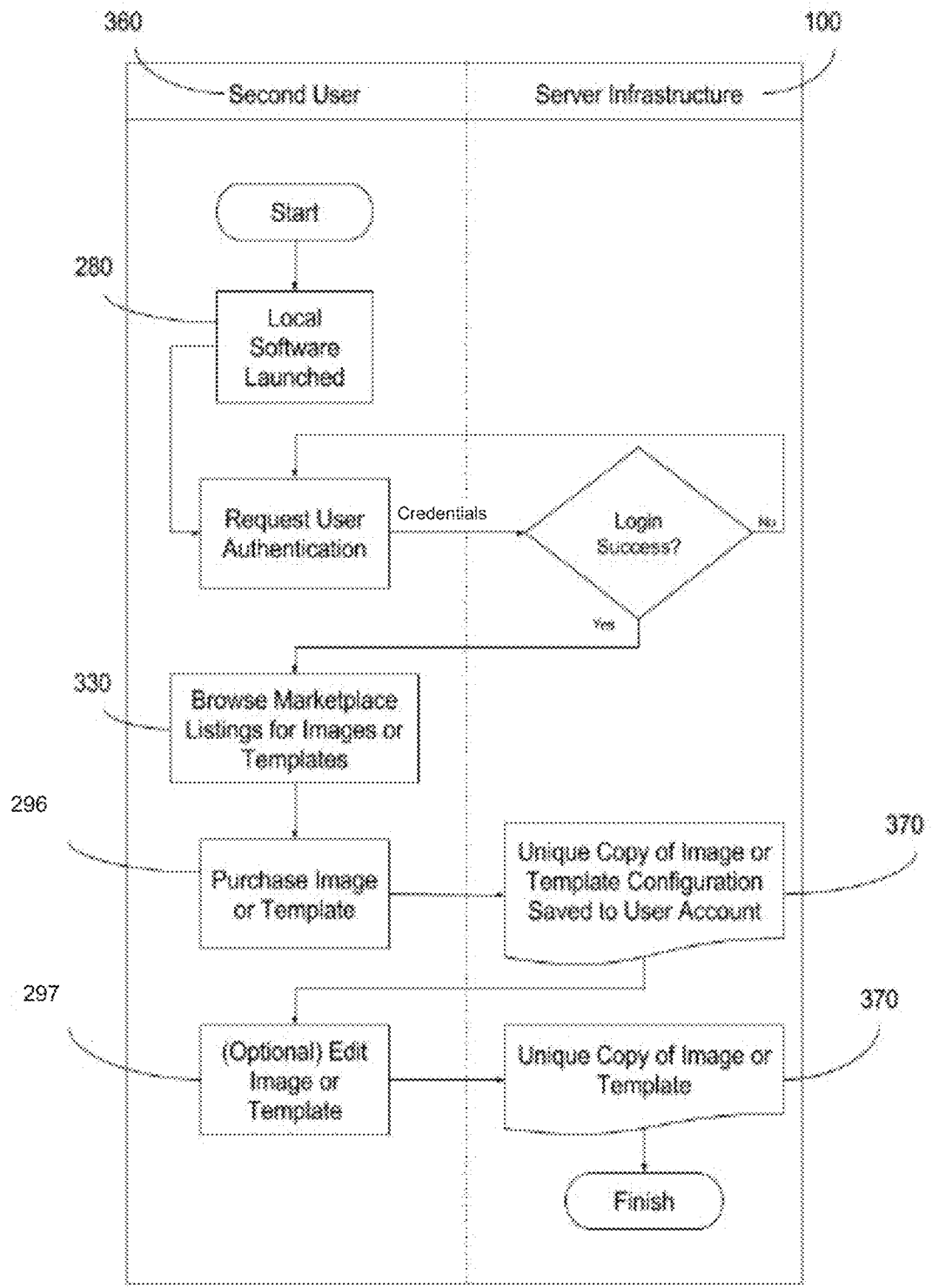
FIG. 5 shows a software flowchart and functional method for purchasing overlay images in a marketplace.

FIG. 5 shows an illustrative process view of a user purchasing an Image or Template for use in a Graphical Overlay.

A Second User 360 launches the Local Software in step 280. The Local Software may be executed by any type of a Local Computer 230, and it may be presented as a web page or a local application. The First User 350 then uses the Local Software in step 280 to authenticate with the Server Infrastructure 100. Credentials are then passed from the Local Software in step 280 to the Server Infrastructure 100, which validates the authentication attempt.

Once authenticated, the Second User 360 then uses the Local Software to browse Marketplace Listings in step 330 for Images or Templates they want to use in their own Graphical Overlay. When the Second User 360 finds an Image or Template they wish to use in step 296, they can choose to purchase the Image or Template. Purchasing the Image or Template saves a Unique Copy of the Image or Template to the Second User's 360 account in step 370. The Second User 360 then has the option to edit the Image or Template in step 297, which updates the Unique Copy of the Image Configuration or Template Configuration in their account. Editing the Image or Template can include changing the underlying graphics included or changing the specific data event(s) with which the Image or Template is associated.

Configuring an Overlay

Figure 6:
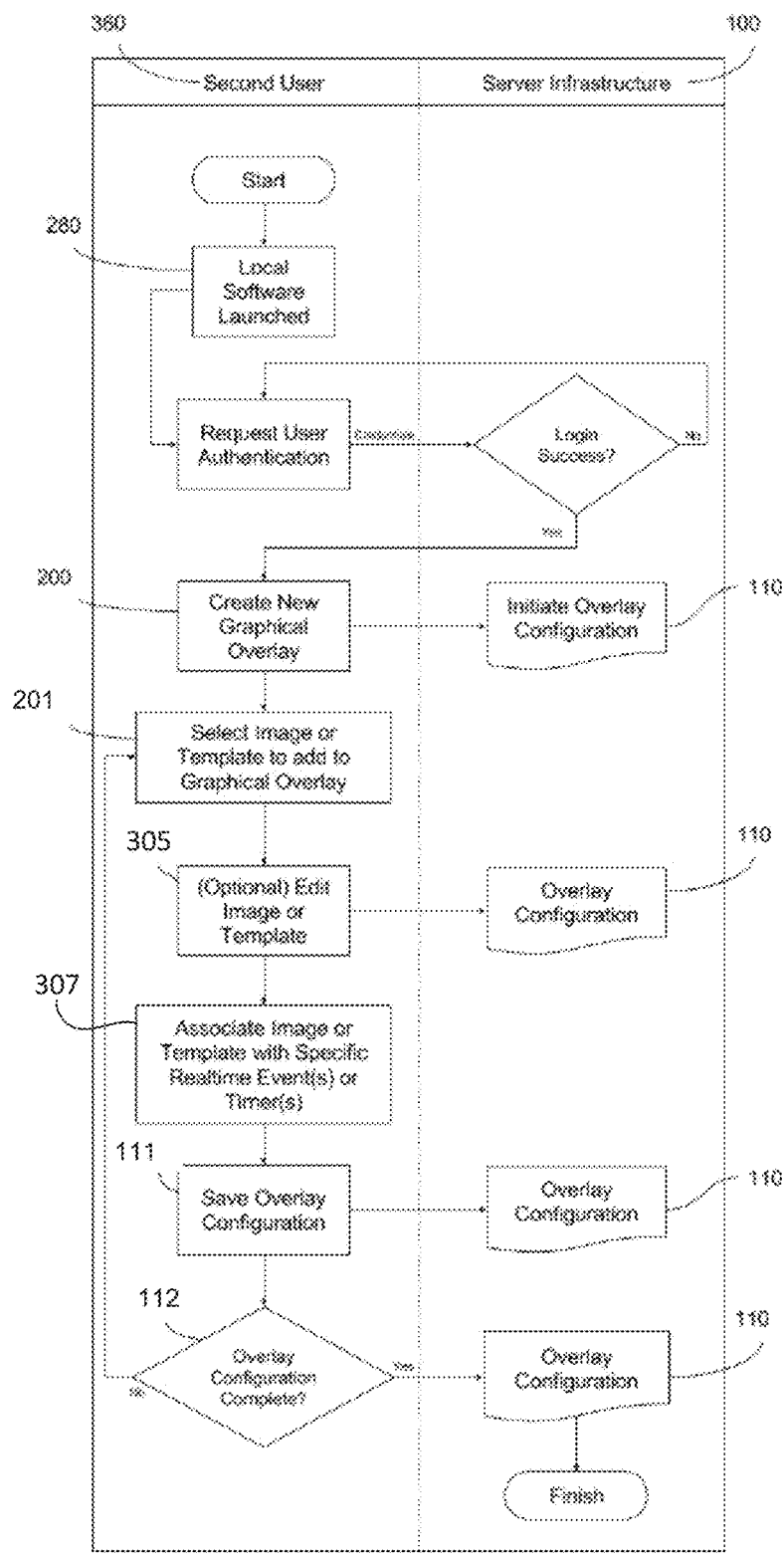
FIG. 6 shows a software flowchart of a system for configuring a multimedia overlay.

FIG. 6 shows an illustrative process view of a user configuring their Graphical Overlay.

A Second User 360 launches the Local Software in step 280. The Local Software may be executed by any type of a Local Computer 230, and it may be presented as a web page or a local application. The First User 350 then uses the Local Software as in step 280 to authenticate with the Server Infrastructure 100. Credentials are then passed from the Local Software to the Server Infrastructure 100, which validates the authentication attempt.

Once authenticated, the Second User 360 then uses the Local Software to create a new Graphical Overlay in step 200, which saves a new copy of the Overlay Configuration in step 110 in the Server Infrastructure 100. The Second User 360 then selects Images or a Templates to add the Graphical Overlay in step 201. The Second User 360 then has the option to edit the Image or Template in step 305, which updates the Overlay Configuration as in step 110 in their account.

In some embodiments, the Second User 360 then associates the Image or Template with specific real time event(s) in step 307. In another embodiment, the Second User 360 then associates the Image or Template with timer(s). In yet another embodiment, the First User 350 has already associated the Image or Template with specific real-time event(s), so the Second User 360 either verifies or modifies the existing associations. Once the Second User 360 makes any of the aforementioned modifications, the Overlay Configuration is updated in their account as in step 111.

The Second User 360 determines whether the Graphical Overlay is complete in step 112. If not, the Second User 360 repeats the process of adding Images or Templates to the Graphical Overlay as in step 201. If so, the final Overlay Configuration is saved to the user's account for later retrieval as in step 110.

Graphical Overlay

Figure 7:
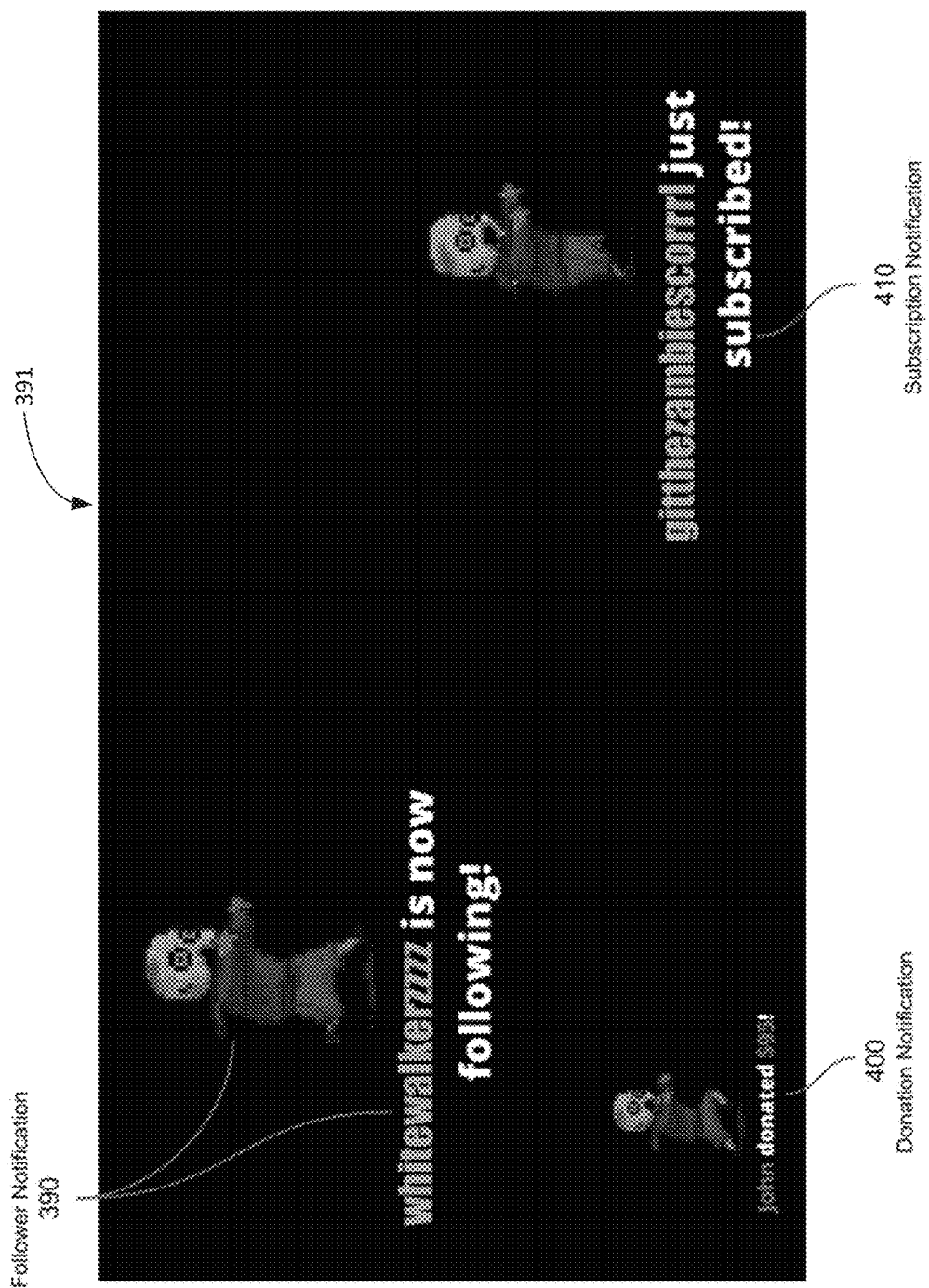
FIG. 7 shows a non-limiting example of a configured multimedia overlay.

FIG. 7 is a non-limiting example of a configured video overlay shown on a display 391, according to some embodiments. In some embodiments, Images and Templates within the Graphical Overlay are configured to appear when the Streaming Service API(s) 130 report specific events including. The notifications can include, but are not limited to:

1. A Viewer 170 has followed the Second User 360, meaning they will receive notifications from the Streaming Service when the Second User's 360 broadcast is active.
2. A Viewer 170 has subscribed to the Second User's 360 channel. When a Viewer 170 subscribes to a streamer's channel, they pay a monthly subscription fee in exchange for subscriber-only privileges, such as access to subscriber-only interactions with the Second User 360 and their channel, or access to the Second User's 360 private chat servers or newsletters. The benefits are configured by the Second User 360, therefore are not limited to nor required to include the aforementioned benefits.

3. A Viewer 170 has donated money to the Second User 360. While Streaming Services 150 provide the infrastructure for Viewers 170 to subscribe or follow the Second User 360, monetary donations are usually facilitated by third party services, such as Streamlabs. The Streaming Service 150 provides a button the Viewer 170 can select while viewing the Second User's 360 channel to donate money to the Second User 360. The button either redirects the Viewer 170 to a third-party page where they are prompted for their credit card information, it provides a pop-up directly over the video feed where credit card information can be entered, or it processes the payment by accessing payment information stored in the Viewer's 170 account with the Streaming Service 150.

In the non-limiting example illustrated in FIG. 7, a Follower Notification 390 comprises a predetermined animation and text conveying that a Viewer 170, in this case "whitewalkerzzzz", has followed the Second User 360. The Donation Notification 400 also comprises a predetermined animation and text conveying that a Viewer 170, in this case "John", has donated, in this case, $95 to the Second User 360. The Subscription Notification 410 also comprises a predetermined animation and text conveying that a Viewer 170, in this case "gitthezambiescorrrl", has subscribed to the Second User's 360 channel.

The aforementioned are non-limiting examples of Images being written to a Graphical Overlay image file in response to specific Streaming Service API 130 data points. Said Graphical Overlay image file will be subsequently retrieved by the Second User's 360 Local Broadcast Software 240, where, per the example provided in FIG. 1 and FIG. 2, it will be combined with the Game Signal 220 and optionally the User Signal 210 by the Video Encoder 190 to produce an encoded video file. In the non-limiting example illustrated in FIG. 7, the black background represents a transparent layer, and the Graphical Overlay will appear as if it is "on top" of the video signals provided by the Game Signal 220 and the User Signal 210.

In some embodiments, one or more of the aforementioned examples might include text without an associated Image. In other embodiments, one or more of the aforementioned examples might include an Image without text. Furthermore, while editing the Graphical Overlay the Second User 360 may assign the position at which each notification appears. In some embodiments, the program automatically recommends the position for the Second User 360, which the Second User 360 can adjust. The Second User 360 may also change the font, the font colors, the animation included, the duration, transitions, and a wide range of additional configuration options to personalize their Graphical Overlay.

First Illustrative Embodiment

Figure 8:
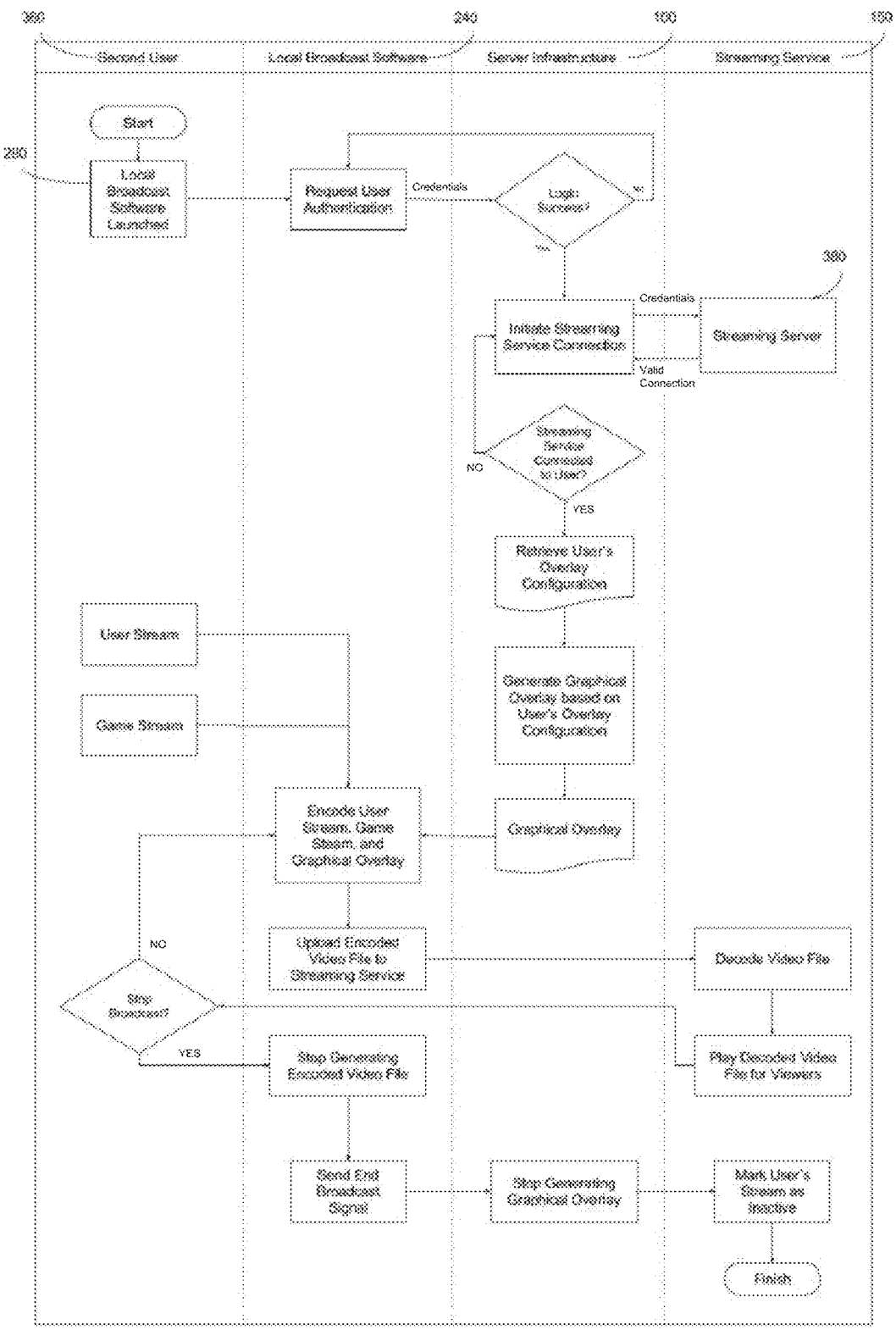
FIG. 8 shows a software flowchart and functional distribution for a first illustrative embodiment.

FIG. 8 shows a beginning-to-end illustrative process view of the disclosed methods, wherein the streaming architecture is direct and the video overlay is static.

A Second User 360 launches the Local Software in step 280. The Local Software may be executed by any type of a Local Computer 230, and it may be presented as a web page or a local application. The First User 350 then uses the Local Software in step 280 to authenticate with the Server Infrastructure 100. Credentials are then passed from the Local Software to the Server Infrastructure 100, which validates the authentication attempt.

Once authenticated, the Second User 360 then uses the Local Software to initiate a connection with the Streaming Service 150. The Second User's 360 credentials or API token are passed to the Streaming Service's 150 Streaming Server(s) in step 380. The Streaming Server(s) in step 380 then reject the attempt or confirm that the connection is valid. If the connection is rejected, the Server Infrastructure 100 prompts the Local Broadcast Software 240 to attempt authentication again. If the connection is valid, the Server Infrastructure 100 retrieves the Second User's 360 Overlay Configuration 110, which contains one or more Image(s) or Template(s) that the Second User 360 obtained from a Graphical Overlay Marketplace 340. The Overlay Configuration 110 is then used to begin generating the Graphical Overlay image file. Variations in the generated Graphical Overlay typically consist of animations based on timers or images that remain static until manually changed by the Second User 360. The Graphical Overlay is then generated at regular intervals for as long as the Second User's 360 streaming session is active.

The Local Broadcast Software 240 then collects the user's Game Signal 220, User Signal 210, and retrieves the generated Graphical Overlay from the Server Infrastructure 100. The sources are then encoded by the Video Encoder 190 and uploaded to the Streaming Service 150 using a Streaming Protocol 180, including but not limited to HLS, FLV, RTMP, RTSP, and DASH, where it is decoded and played for Viewers 170 to consume.

The aforementioned process of encoding the sources to playback repeats until the Second User 360 decides to stop the broadcast. When the broadcast is stopped, the Local Broadcast Software 240 stops generating and uploading the encoded video file; it then sends a signal to end the broadcast, the Server Infrastructure 100 stops generating the Graphical Overlay, and the Streaming Service 150 marks the Second User's 360 stream as inactive.

Second Illustrative Embodiment

Figure 9A:
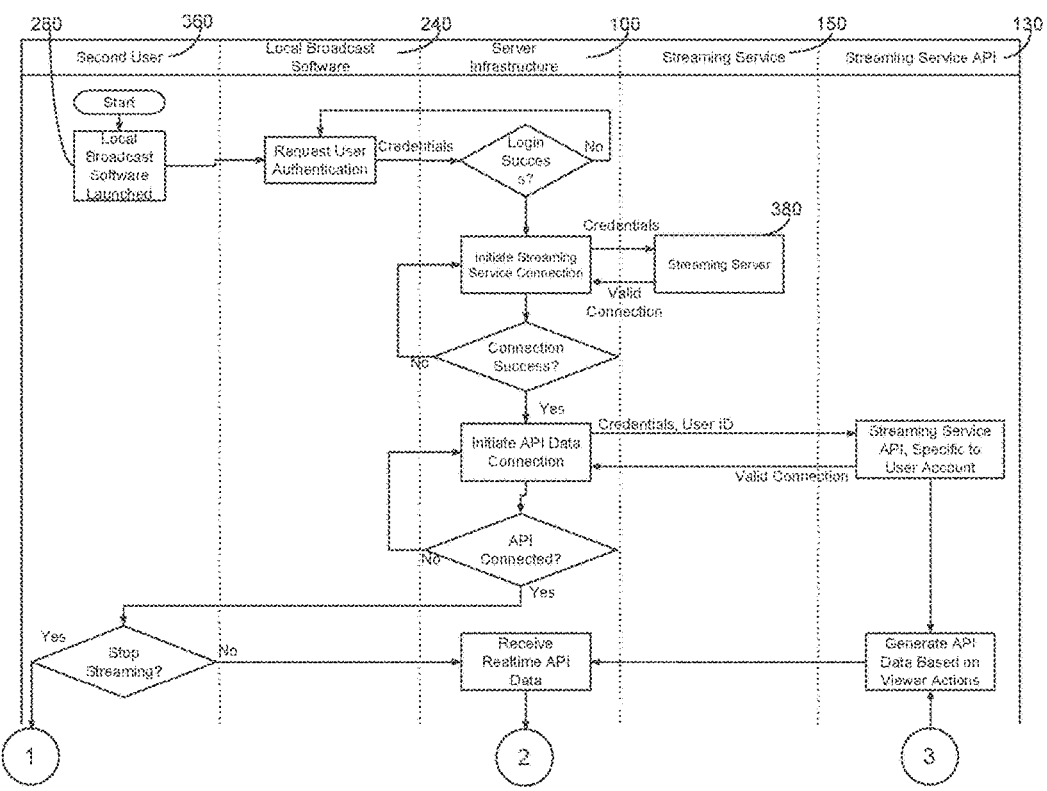
FIGS. 9A and 9B show a software flowchart and functional distribution for a second illustrative embodiment.
Figure 9B:
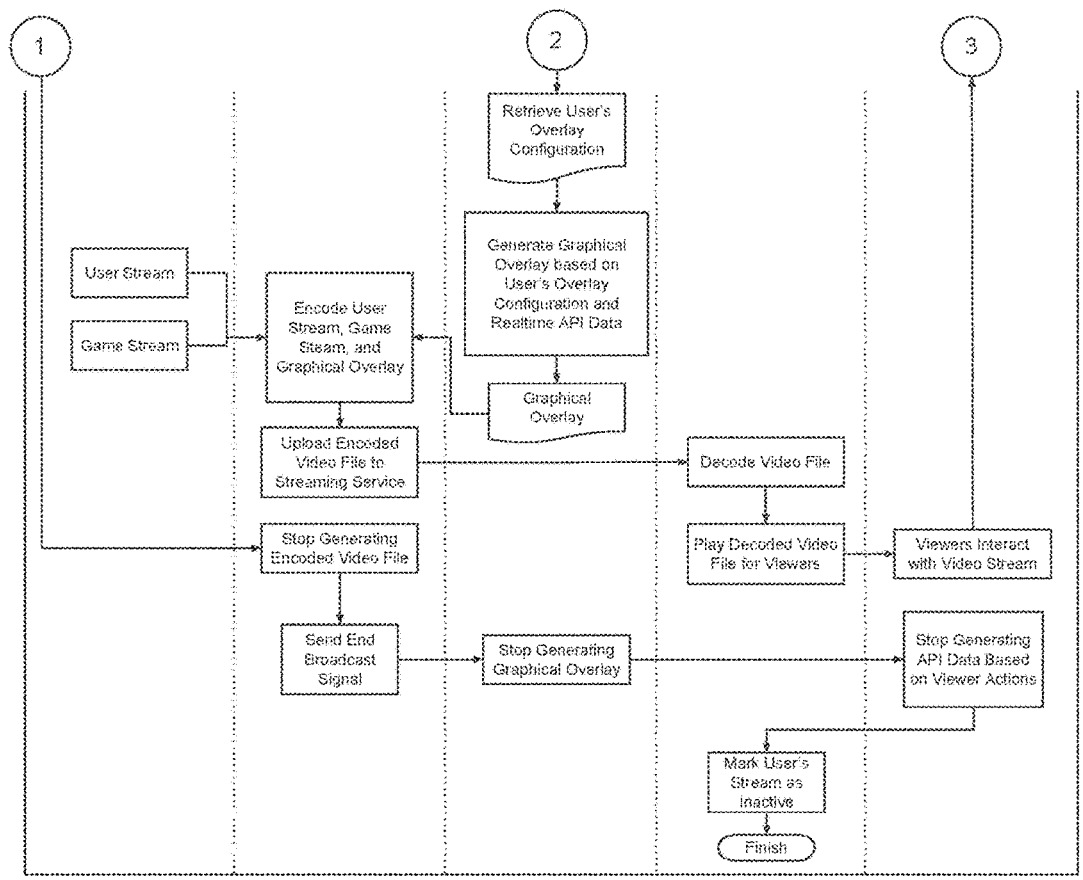

FIGS. 9A and 9B show a beginning-to-end illustrative process view of the disclosed methods, wherein the streaming architecture is direct and the video overlay is dynamic.

A Second User 360 launches the Local Software in step 280. The Local Software may be executed by any type of a Local Computer 230, and it may be presented as a web page or a local application. The First User 350 then uses the Local Software in step 280 to authenticate with the Server Infrastructure 100. Credentials are then passed from the Local Software to the Server Infrastructure 100, which validates the authentication attempt.

Once authenticated, the Second User 360 then uses the Local Software to initiate a connection with the Streaming Service 150. The Second User's 360 credentials or API token are passed to the Streaming Service's 150 Streaming Server(s) in step 380. The Streaming Server(s) in step 380 then reject the attempt or confirm that the connection is valid. If the connection is rejected, the Server Infrastructure 100 prompts the Local Broadcast Software 240 to attempt authentication again. If the connection is valid, the Server Infrastructure 100 initiates a connection to the Streaming Service API 130 to begin reading data related to the Second User's 360 channel. The Streaming Service API 130 then rejects the Server Infrastructure's 100 connection attempt or confirms that the connection is valid. If the connection is rejected, the Server Infrastructure 100 attempts to initiate the connection to the Streaming Service API 130 again. If the connection is valid, the Server Infrastructure 100 begins receiving real time data events from the Streaming Service API 130 and retrieves the Second User's 360 Overlay Configuration 110, which contains one or more Image(s) or Template(s) that the Second User 360 obtained from the Graphical Overlay Marketplace of step 340. The Overlay Configuration 110 and data from the Streaming Service API 130 are then used to begin generating the Graphical Overlay image file. Variations in the generated Graphical Overlay typically consist of animations, Images or Templates that are configured to appear when the Server Infrastructure receives specific data events from the Streaming Service API 130. Variations can also consist of Images that remain static until manually changed by the Second User 360. The Graphical Overlay is then generated at regular intervals for as long as the Second User's 360 streaming session is active.

The Local Broadcast Software 240 then collects the user's Game Signal 220, User Signal 210, and retrieves the generated Graphical Overlay from the Server Infrastructure 100. The sources are then encoded by the Video Encoder 190 and uploaded to the Streaming Service 150 using a Streaming Protocol 180, including but not limited to HLS, FLV, RTMP, RTSP, and DASH, where it is decoded and played for Viewers 170 to consume.

As Viewers 270 interact with the Second User's 360 channel, the Streaming Service API 130 records the interactions and converts them into a data format that can be easily shared with the Server Infrastructure 100 via the Streaming Service API 130. Interactions include but are not limited to: chat, subscriptions, follows, donations, and miscellaneous purchases.

The aforementioned process of encoding the sources to playback repeats until the Second User 360 decides to stop the broadcast. When the broadcast is stopped, the Local Broadcast Software 240 stops generating and uploading the encoded video file; it then sends a signal to end the broadcast, the Server Infrastructure 100 stops generating the Graphical Overlay 200, the Streaming Service 150 marks the Second User's 360 stream as inactive, and the Streaming Service API stops generating API data based on Viewer 170 actions.

Third Illustrative Embodiment

Figure 10B:
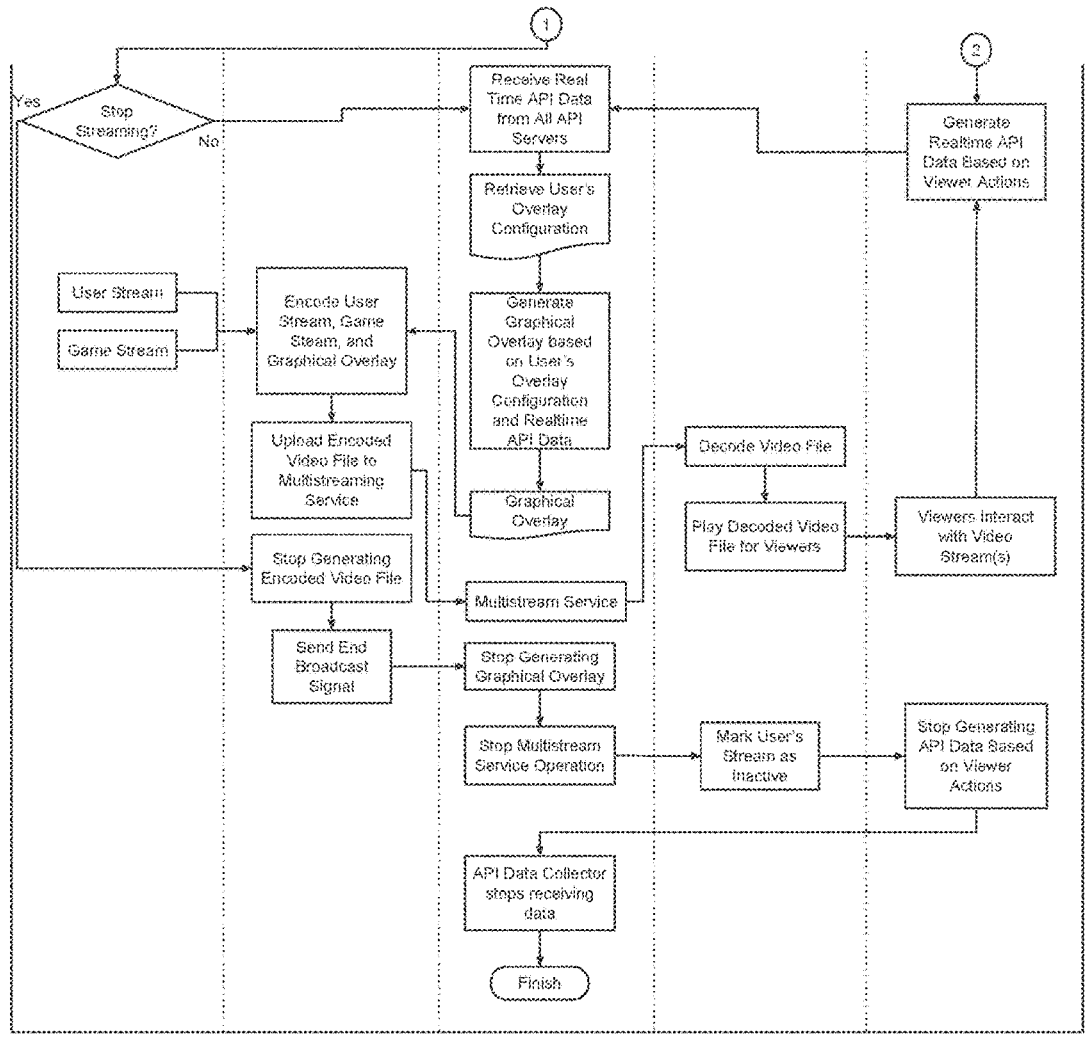

FIGS. 10A and 10B show a beginning-to-end illustrative process view of the disclosed methods, wherein the streaming architecture is direct and the video overlay is dynamic.

A Second User 360 launches the Local Software in step 280. The Local Software may be executed by any type of a Local Computer 230, and it may be presented as a web page or a local application. The First User 350 then uses the Local Software to authenticate with the Server Infrastructure 100. Credentials are then passed from the Local Software to the Server Infrastructure 100, which validates the authentication attempt.

Once authenticated, the Second User 360 uses the Local Software to connect one or more Streaming Service 150 to the Server Infrastructure 100. The Streaming Service 150 connection(s) are then stored in the Second User's 360 account for later access via the Multistream Service 250.

The Second User 360 then launches the Local Broadcast Software 240 in step 245. The Second User 360 uses the Local Broadcast Software to authenticate with the Server Infrastructure 100. Credentials are then passed from the Local Broadcast Software 240 to the Server Infrastructure 100, which validates the authentication attempt.

Once authenticated, the Second User 360 initiates connection(s) with the Streaming Service(s) 150. The Second User's 360 credentials or API tokens are passed to the Streaming Server(s) 380 via the Multistream Service 250, and the Streaming Server(s) 380 return an Active Connection to the Multistream Service 250. Once the connection(s) are returned, the Server Infrastructure 100 initiates the API Data Collector 260 in step 265, which initiates and maintains connections with the Streaming Service API(s) 130. The API Data Collector 260 then begins reading data related to the Second User's 360 channel(s) for each of the Streaming Service(s) 150 to which the Second User 360 has active connections. The Streaming Service API(s) 130 then reject the API Data Collector's 260 connection attempts or confirm that the connection(s) are valid. If the connections are rejected, the API Data Collector 260 attempts to initiate the connection to the Streaming Service API(s) 130 again. If the connections are valid, the API Data Collector 260 begins receiving real time data events from the Streaming Service API(s) 130.

The Server Infrastructure 100 then retrieves the Second User's 360 Overlay Configuration 110, which contains one or more Image(s) or Template(s) that the Second User 360 obtained from a Graphical Overlay Marketplace 340. The Server Infrastructure 100 then uses the Overlay Configuration 110 and data from the API Data Collector 260 to begin generating the Graphical Overlay image file. Variations in the generated Graphical Overlay typically consist of animations, Images or Templates that are configured to appear when the Server Infrastructure receives specific data events from the API Data Collector 260. Variations can also consist of Images 300 that remain static until manually changed by the Second User 360. The Graphical Overlay is then generated at regular intervals for as long as the Second User's 360 streaming session is active.

In some embodiments, each Graphical Overlay is generated based on API data specific to the associated Streaming Service 150. In other embodiments, data from one or more Streaming Service(s) 150 may be used to generate a single Graphical Overlay 200 that contains consolidated notifications from one or more Streaming Service(s) 150.

The Local Broadcast Software 240 then collects the user's Game Signal 220, User Signal 210, and retrieves the generated Graphical Overlay from the Server Infrastructure 100. The sources are then encoded by the Video Encoder 190 and uploaded to the Multistream Service using a Streaming Protocol 180, including but not limited to HLS, FLV, RTMP, RTSP, and DASH. The Multistream Service 250 then uploads the file using a Streaming Protocol 180 to each of the active Streaming Service 150 connections in the Second User's 360 account. Once uploaded to each of the Streaming Service(s) 150, the encoded video file is decoded and played for Viewers 170 to consume.

In other embodiments, the Multistream Service 250 decodes the video file, then uses a Video Encoder 190 to re-encode a copy of the video file in a manner that is optimized for each of the Streaming Service(s) 150 prior to uploading it to the Streaming Service(s) 150 using a Streaming Protocol 180.

As Viewers 270 interact with the Second User's 360 channel(s) on the various Streaming Service(s), the Streaming Service API(s) 130 record the interactions and convert them into a data format that can be easily shared with the API Data Collector 260. Interactions include but are not limited to: chat, subscriptions, follows, donations, and miscellaneous purchases.

In some embodiments, Alternative API Data Sources 270, data from sources other than the Streaming Service API(s) 130, may send data to the API Data Collector of step 260 for use in creating Graphical Overlays.

The aforementioned process of encoding the sources to playback repeats until the Second User 360 decides to stop the broadcast. When the broadcast is stopped, the Local Broadcast Software 240 stops generating and uploading the encoded video file; it then sends a signal to end the broadcast, the Server Infrastructure 100 stops generating the Graphical Overlay, the Multistream Service 250 stops operation and notifies the Streaming Service(s) 150 to mark the Second User's 360 stream(s) as inactive, the Streaming Service API(s) 130 stop generating data based on Viewer 170 actions, and the API Data Collector 260 stops receiving data.

The various steps recited herein are not intended to limit the inventive aspects of this disclosure to a particular arrangement or embodiment. The various steps, processes, and methods recited herein may be practiced in any order or arrangement consistent with the disclosure.

What is claimed is:

1. A system for a virtual marketplace of video overlays for video content broadcasting, the system comprising:

non-transitory storage media configured to store overlay content information and overlay configuration information corresponding to one or more video overlays, wherein the overlay content information defines an image and/or audio and the overlay configuration information specifies values for one or more settings that define application of the image and/or audio to overlayed video content, wherein the one or more settings that define application of the overlay configuration information to the overlayed video content includes one or more settings that specify a real-time event trigger defining when the overlay configuration information is applied to the overlayed video content, wherein the real-time event trigger includes a second user's interaction with the overlayed video content;

one or more processors configured by machine-readable instructions to:

transmit, to client computing platforms associated with users, information that facilitates presentation of one or more views of the virtual marketplace on the client computing platforms, wherein a view of the virtual marketplace includes one or more overlay offers to sell access to the one or more video overlays, wherein the views of the virtual marketplace include one or more visual representations of the overlay content information corresponding to the one or more video overlays to enable inspection of the one or more video overlays and acceptance of individual ones of the one or more overlay offers;

receive an acceptance of one or more overlay offers from the client computing platforms associated with the users; and responsive to reception of an acceptance of one or more accepted overlay offers from a first client computing platforms associated with a first user, provide the first client computing platform associated with the first user access to corresponding accepted video overlays so that the first client computing platform is enabled to generate generated video content that includes the image and/or audio defined by the overlay content information corresponding to the one or more accepted video overlays applied to the overlayed video content in accordance with the overlay configuration information corresponding to the one or more accepted video overlays.

2. The system of claim 1, wherein the image of a video overlay is applied to the overlayed video content as a filter.

3. The system of claim 1, wherein the video content includes image and/or audio information captured by the client computing platforms.

4. The system of claim 1, wherein the one or more settings that define application of the image and/or audio of the one or more video overlays to overlayed video content further includes one or more settings that specify positions of the image applied to the overlayed video content and one or more settings that specify a duration of the image and/or audio to the overlayed video content.

5. The system of claim 1, wherein users can present overlay offers to another user through the virtual marketplace, wherein the one or more processors are further configured by machine-readable instructions to:

receive uploads of overlay content information for one or more video overlays from client computing platforms associated with users to the virtual marketplace including overlay offers to sell access to one or more video overlays.

6. The system of claim 1, wherein the overlay configuration information for the given video overlay can be modified by a user via the client computing platforms.

7. The system of claim 1, wherein the image and/or audio defined by the overlay content information is applied to the overlayed video content by the one or more processors further configured by machine-readable instructions to:

receive the video content from the client computing platforms;

apply the image and/or audio defined by the overlay content information to the overlayed video content in accordance with the overlay configuration information; and transmit the generated video content to the client computing platforms.

8. The system of claim 1, wherein the real-time event trigger corresponds to one or more of a chat notification, a subscription notification, a donation notification, or a new follower notification.

9. A system for applying video overlays from a virtual marketplace to video content for broadcasting, wherein the virtual marketplace includes overlay content information for one or more video overlays that define an image and/or audio corresponding to the one or more video overlays and overlay configuration information that specifies values for one or more settings that define application of the overlay content information corresponding to one or more video overlays to overlayed video content, wherein the one or more settings that define application of the overlay configuration information to the overlayed video content includes one or more settings that specify a real-time event trigger defining when the overlay configuration information is applied to the overlayed video content, wherein the real-time event trigger includes a second user's interaction with the overlayed video content, the system comprising:

one or more processors configured by machine-readable instructions to:

receive, from a first server associated with the virtual marketplace, information that facilitates presentation of views of the virtual marketplace on client computing platforms associated with users, wherein a view of the virtual marketplace includes one or more overlay offers to sell access to the one or more video overlays, wherein the views of the marketplace includes one or more visual representations of images of the one or more video overlays to enable inspection of the one or more video overlays and acceptance of individual ones of the overlay offers; and transmit, to the first server, an acceptance of one or more accepted overlay offers from the client computing platforms associated with the users such that responsive to reception of the acceptance of the one or more overlay offers from the client computing platforms associated with the users, obtain access to one or more accepted video overlays corresponding to the one or more accepted overlay offers so that individual client computing platforms of the client computing platforms are enabled to generate generated video content that includes the image and/or audio defined by the overlay content information of the one or more accepted video overlays applied to the video content in accordance with the overlay configuration information for the one or more accepted video overlays, wherein the generated video content is encoded prior to a transmission to a third server for broadcasting.

10. The system of claim 9, wherein the video content is transmitted to a second server associated with the virtual marketplace to generate the generated video content that includes the image and/or audio defined by the overlay content information of the one or more video overlays applied to the overlayed video content in accordance with the overlay configuration information for the one or more video overlays; and the generated video content is received from the second server prior to the encoding of the generated video content for the transmission to the third server for broadcasting.

11. The system of claim 10, wherein the second server used to generate the generated video content includes one or more processors configured by machine-readable instructions to:

receive the video content from the individual client computing platforms;

apply the image and/or audio defined by the overlay content information of the one or more accepted video overlays to the video content in accordance with the overlay configuration information for the given video overlay to the video content; and transmit generated video content to the individual client computing platforms.

12. The system of claim 9, wherein the image of the one or more video overlays is applied to video content as a filter.

13. The system of claim 9, wherein the video content includes image and/or audio information captured by the client computing platforms.

14. The system of claim 9, wherein the one or more settings that define application of the image and/or audio of the given video overlay to overlayed video content further includes one or more settings that specify positions of the image of the given video overlay applied to overlayed video content and one or more setting that specify a duration of the image and/or audio of the video overlay applied to overlayed video content.

15. The system of claim 14, wherein the real-time event triggers include interactions with the generated video content from the third server.

16. The system of claim 9, wherein the overlay configuration information for the one or more video overlays can be modified by a user via the individual client computing platforms.

17. The system of claim 9, wherein the real-time event trigger corresponds to one or more of a chat notification, a subscription notification, a donation notification, or a new follower notification.

* * * * *